(12) United States Patent
Edwards et al.

(10) Patent No.: US 12,175,310 B2
(45) Date of Patent: Dec. 24, 2024

(54) PERCEPTIVE SCALING OF COMPUTING RESOURCES

(71) Applicant: Capital One Services, LLC, McLean, VA (US)

(72) Inventors: Joshua Edwards, Philadelphia, PA (US); Michael Mossoba, Great Falls, VA (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 166 days.

(21) Appl. No.: 17/676,653

(22) Filed: Feb. 21, 2022

(65) Prior Publication Data

US 2023/0267019 A1   Aug. 24, 2023

(51) Int. Cl.
   *G06F 9/54* (2006.01)
   *G06F 9/50* (2006.01)

(52) U.S. Cl.
   CPC .............. *G06F 9/542* (2013.01); *G06F 9/505* (2013.01)

(58) Field of Classification Search
   CPC ........ G06F 9/50; G06F 9/5055; G06F 9/5011; G06F 9/5016; G06F 9/5027; G06F 9/542; G06F 16/1734; H04L 41/06; H04L 41/0604
   See application file for complete search history.

(56) References Cited

U.S. PATENT DOCUMENTS

| | | | | |
|---|---|---|---|---|
| 9,032,078 | B2* | 5/2015 | Beerse | H04L 47/70 709/226 |
| 9,729,466 | B2* | 8/2017 | Kodali | H04L 67/10 |
| 9,781,051 | B2* | 10/2017 | Bertram | H04L 67/562 |
| 10,277,524 | B1 | 4/2019 | Kaitha et al. | |
| 10,761,889 | B1 | 9/2020 | Jain et al. | |
| 11,164,125 | B2 | 11/2021 | Pandey et al. | |
| 11,194,638 | B1* | 12/2021 | Danilov | G06F 9/5083 |
| 11,226,844 | B1* | 1/2022 | Palmer | G06F 9/505 |
| 2014/0068335 | A1 | 3/2014 | Bromley et al. | |
| 2015/0081877 | A1 | 3/2015 | Sethi et al. | |
| 2017/0134743 | A1 | 5/2017 | Sim et al. | |
| 2018/0287956 | A1 | 10/2018 | Bryc et al. | |
| 2019/0179944 | A1 | 6/2019 | Ungar et al. | |
| 2021/0096913 | A1* | 4/2021 | Nadeau | G06F 11/3058 |
| 2021/0109789 | A1 | 4/2021 | McWeeney | |
| 2021/0218639 | A1 | 7/2021 | Chen et al. | |
| 2021/0240517 | A1 | 8/2021 | Mohapatra et al. | |

* cited by examiner

*Primary Examiner* — Andy Ho
(74) *Attorney, Agent, or Firm* — Foley & Lardner LLP

(57) ABSTRACT

Perceptive scaling of computing resources is disclosed. News sources can be analyzed to identify a future event as well as an occurrence date and type of the event. A computing resource affected by the event can be determined based on the type of event. A scaling strategy can be formulated for the computing resource, such as scaling up or out, to address resource load introduced by the event. The extent of scaling can be determined based on the predicted impact of the event on the computing resource. Subsequently, the scaling strategy can be scheduled for execution before the occurrence date. The scaling strategy can later be terminated or deactivated after the event terminates.

20 Claims, 8 Drawing Sheets

PERCEPTIVE SCALING OF COMPUTING RESOURCES

BACKGROUND

In computing, scalability is a system characteristic that adapts to additional load by adding resources to the system rather than degrading service or failing. Scaling can be vertical or horizontal. Vertical scaling, also termed scale-up, refers to increasing the capacity of a single node or computer, such as by adding a central processing unit, memory, or storage. Horizontal scaling, also called scale-out, refers to adding more instances of the same type to a pool of resources without increasing the capacity of existing resources. For example, the number of servers can be increased without changing the capacity of individual servers.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to perceptive computing resource scaling. Electronic news sources can be analyzed to detect future events. A future event can be analyzed to determine characteristics of the event, such as date of occurrence, type of event, and impact of the event. Further, a score can be computed for the event that provides a measure indicating a likelihood the event will occur, be impactful, or both. Computing resources affected by the event are identified based in part on metadata associated with the computing resources and event type. Further, dependent computing resources upstream or downstream of a primary computing resource can also be identified. A scaling strategy can be formulated based on the result of the event analysis, including affected computing resources. The scaling strategy can then be scheduled for execution before the event occurs in preparation for additional load associated with the event.

According to one aspect, a perceptive resource scaling system is provided that comprises a processor coupled to a memory that includes instructions that, when executed by the processor, cause the processor to invoke machine-learning-based text analysis to identify a future event and date of the future event from an electronic news source, classify the event as a type of event based on text analysis of context surrounding the event in the electronic news source, identify a computing resource affected by the event based on the type and a metatag associated with the computing resource that identify a type of event that affects the computing resource, generate a scaling strategy for the computing resource that accounts for a change in resource utilization associated with the event, and trigger execution of the scaling strategy at a predetermined time before the date. The instructions can further cause the processor to infer impact of the event on the computing resource and generate the scaling strategy proportionate to the impact. In accordance with one aspect, the processor can infer the impact based on a number of news reports of the event. Alternatively, the processor can invoke a machine learning model that infers the impact based on similarity of the event to a prior event. In one scenario the scaling strategy comprises addition of computing resources. The instructions can further cause the processor to determine a duration of the event and schedule termination of execution of the scaling strategy at a predetermined time after the duration of the event. Further, the instructions can cause a processor to determine a confidence level associated with occurrence of the event and generate the scaling strategy based on the confidence level. In one instance, the confidence level is determined based on a number of news sources reporting the event. The instructions can also cause the processor to identify a dependent computing resource of the computing resource and generate the scaling strategy including the dependent computing resource.

In accordance with another aspect, a method of perceptive scaling of computing resources is provided comprising executing, on a processor, instructions that cause the processor to perform operations associated with perceptive resource scaling. The operations comprise invoking machine-learning-based text analysis to identify a future event and date of occurrence from an electronic news source, determining an event type based on analysis of context surrounding the event in the electronic news source, identifying a computing resource impacted by the event based on the event type and metatag associated with the computing resource that identifies the event type as affecting the computing resource, generating a scaling strategy for the computing resource, and triggering execution of the scaling strategy a predetermined time before the date. The operations further comprise evaluating metatags associated with a plurality of computing resources and identifying the computing resource from the plurality of computing resources based on a match between the event type determined and the event type specified in the metatag of the computing resource. Further, the operations include inferring an impact of the event on the computing resource and generating the scaling strategy proportionate to the impact. In one instance, the operations comprise determining the impact based on a number of reports of the event. In another instance, the operations comprise inferring the impact based on comparison to a similar prior event. Further, the operations can comprise inferring the impact based on information specified in an electronic news source. The operations can also comprise identifying a dependent computing resource of the computing resource specified in the metatag and generating the scaling strategy includes scaling of the dependent computing resource. Furthermore, the operations can comprise determining a duration of the event and scheduling termination of the scaling strategy at a predetermined time after the duration of the event.

According to yet another aspect, a resource scaling method is provided. The method comprises identifying a previously unknown future event and date of occurrence from an electronic news source with automated text analysis, determining a type of the event based on context surrounding the future event in the electronic news source, identifying a computing resource affected by the event based on the type and metatags associated with computing resources, generating a scaling strategy for the computing resource, wherein the scaling strategy adds computing resources to support an additional load from the event, and triggering execution of the scaling strategy at a predetermined time before the date of occurrence. The method further comprising computing a confidence score associated with at least one of a likelihood that the event will occur or a likelihood that the event will be impactful and controlling the generating of the scaling strategy based on the confidence score.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
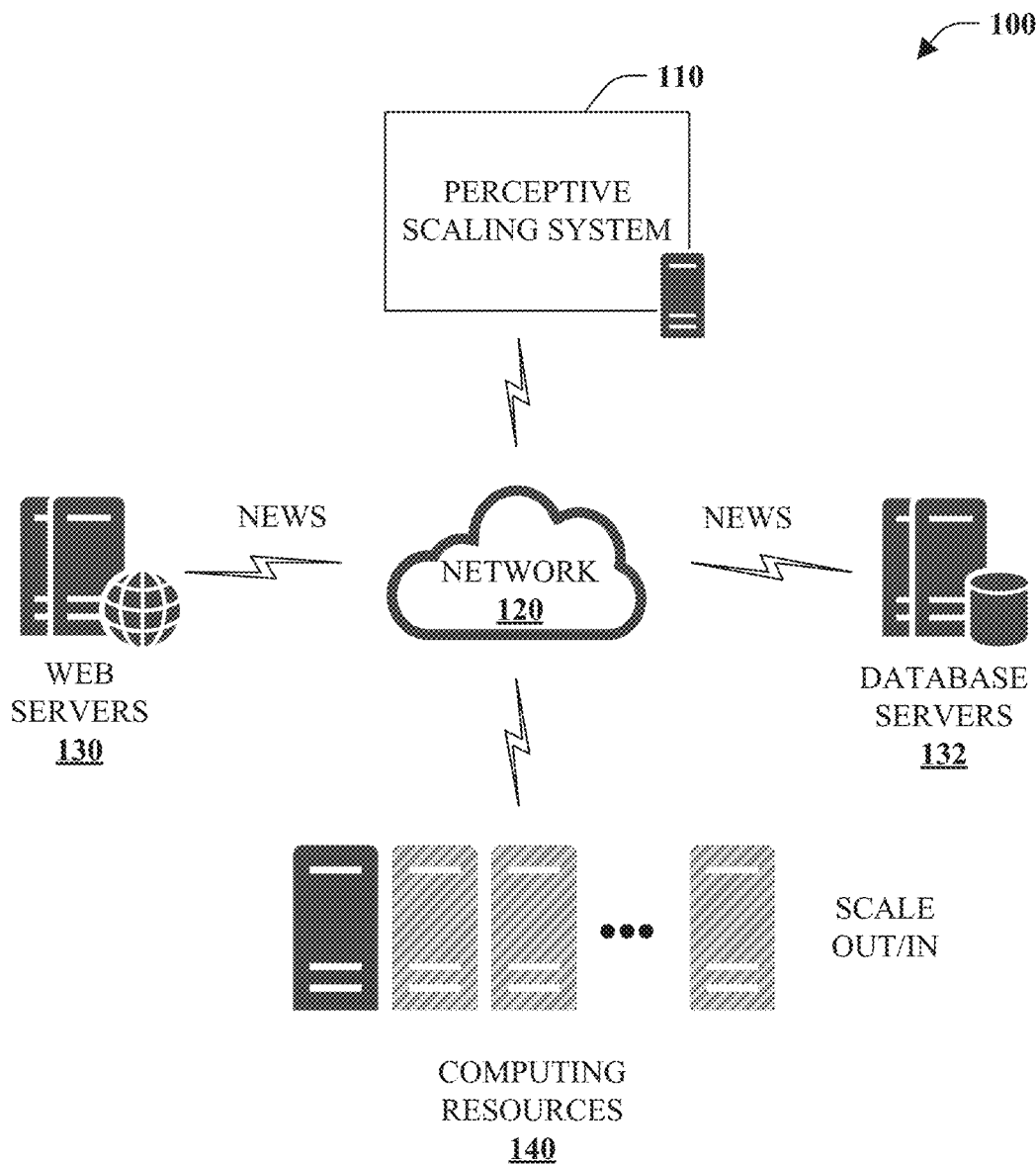
FIG. 1 illustrates an overview of an example implementation.

Conventionally, scaling can be reactive or proactive, often referred to together as simply automatic scaling. Reactive scaling is responsive to the current load of a computing resource. A threshold value can be set, and, when satisfied, scaling can be performed. For example, if a server starts to experience a fifty percent load, a scale-up process can be performed to start up a new server. Proactive or predictive scaling involves scaling based on a known load that is likely to appear in the future based on historical data. For instance, if there is a pattern in historical data that a vast amount of server traffic occurs between 9 a.m. and 5 p.m., proactive scaling can schedule additional servers to be spun up before 9 a.m. and spun down after 5 p.m. to handle the load.

Current automatic scaling fails to account for external factors, such as political, legal, or environmental considerations. External factors correspond to unknown events. An example of an external factor, or unknown event, can be governmental action in the form of a first-ever stimulus check deposited into a majority of citizens' bank accounts. For a financial institution such as a bank, this can dramatically increase network traffic as massive numbers of people begin logging on to their accounts at the same time to determine whether or not the stimulus check was deposited. Proactive scaling cannot account for this event as no historical data could predict an unknown event. As a result, the fallback is reactive scaling, resulting in significant outages as the system seeks to catch up with the traffic.

Details herein pertain to perceptive scaling of computing resources. Perceptive scaling augments conventional proactive or predictive scaling to include data analysis outside historical data to identify events that impact computing resources. Data from various news sources can be analyzed to identify future events. These future events can be further analyzed to determine the occurrence date and event type. A computing resource affected by the event can be identified based on the event type compared to computing resource metatags that identify types of events that affect performance. The event's impact on the computer resource can be inferred based on numerous factors. A scaling strategy is subsequently formulated to address the event's impact on the computing resource, and the scaling strategy is scheduled for execution before the occurrence date. Subsequently, the scaling strategy can be deactivated based on the effective time of the event.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Referring initially to FIG. 1, a high-level overview of an example implementation 100 is depicted. The implementation 100 includes perceptive scaling system 110, network 120, web servers 130, database servers 132, and computing resources 140.

The perceptive scaling system 110 is operable to identify a future event and generate and execute a scaling strategy to address the future event. As opposed to historical data that captures past events and responses, the perceptive scaling system can receive, retrieve, or otherwise obtain or acquire news from one or more network-accessible sources. News is information about current and future events. In one instance, the current events can be informative of future events. Common news topics can correspond to government, politics, weather, or unusual events. For example, the news can report a government agreement to send citizens stimulus checks, declare a new national holiday, or mandate actions. Other news can involve catastrophic weather or other events such as earthquakes, hurricanes, tornados, volcano eruptions, or wildfires.

The perceptive scaling system 110 analyzes text of news to identify events. In one instance, natural language processing (NLP) or other techniques can be employed by the perceptive scaling system 110 to analyze the text. Further, optical character recognition (OCR) or other technology can be utilized to extract text from images, graphics, or the like that can subsequently be analyzed. In addition to extracting text, metadata associated with news reports can also be acquired and analyzed. For instance, a web page can include a metatag that describes the web page's content. Content, metadata, or both can be analyzed to identify one or more future events.

An identified event can be subject to further analysis. For example, events can be classified and potentially filtered out based on significance or potential impact. The occurrence date and duration can also be determined or otherwise inferred from surrounding text. Further, an identified event can be classified or assigned one or more types. The types can potentially identify geographic locations, industry, and product or service, among other things.

Based on the type data associated with the event, computing resources can be identified as likely impacted by the event. Computing resources can also include type data such that a computing resource affected by the event can be identified by matching event type data with computing resource type data. Based on call tracing, dependent computing resources (e.g., upstream or downstream) can also be identified. As such, one or more computing resources affected by the event can be identified.

After an event and one or more affected computing resources are identified, a scaling strategy can be formulated by the perceptive scaling system 110. The scaling strategy can account for the likely impact of the event on the computing resources such that specification of additional resources can be proportional to the impact of the event. The scaling strategy can next be scheduled for execution at a predetermined time before the event. Further, the scaling strategy can be terminated or reversed after the duration of the event has passed.

The network 120 can correspond to at least a wide area network (WAN) or local area network (LAN). In operation, the network 120 enables communication to and from the perceptive scaling system 110. Per one embodiment, the network 120 can correspond to the Internet from which the perceptive scaling system 110 can receive, retrieve, or otherwise obtain or acquire news. The network 120 can also be a local network to enable communication between the perceptive scaling system 110 and the computing resources 140, or a load balancer associated with the computing resources 140, to enable scaling.

News concerning current or future events can be acquired from one or more web servers 130 or other database servers 132. In one instance, the perceptive scaling system 110 can employ a web crawler or robot to browse World Wide Web content. The web crawler could specifically target particular news sources and employ web scraping to extract news from websites. Additionally, or alternatively, the perceptive scaling system 110 could receive or retrieve data from particular news database servers 132. For example, the perceptive scaling system 110 can subscribe to a database server news stream and receive news in substantially real-time.

The computing resources 140 correspond to at least computer hardware, software, and communication devices. For example, the computing resources can correspond to servers of various types, including web, proxy, virtual machine, application, and database servers, among others. Further, the computing resources 140 can include computing-device-specific components, including processing units, memory, data storage, and communication devices. The computing resources are capable of being scaled. As shown, the computing resources 140 include one active server with several other inactive servers. Activating inactive servers can enable additional load to be processed efficiently and corresponds to scaling out with respect to horizontal scaling. Activated servers can be subsequently deactivated or decommissioned to efficiently handle a reduced load, which corresponds to scaling in. A single server can also be scaled up to increase the server's capacity and subsequently scaled down under vertical scaling. Of course, a combination of horizontal and vertical scaling can be employed.

In accordance with one aspect, the perceptive scaling system 110 can be a standalone system or part of an automatic scaling system that includes reactive and proactive scaling. The perceptive scaling system 110 can operate with respect to future unknowable and unpredictable events based on historical data. Nevertheless, the perceptive scaling system 110 can exploit historical data as well. For example, historical data regarding scaling for prior events can guide scaling for an unknown event, for instance, based on similar circumstances.

Consider an example in which the government decides to give substantially all citizens a stimulus check to be deposited electronically in their accounts next Monday, and prior to this decision, no such checks were issued. Given this scenario, the event is an unknown future event. As such, proactive or predictive scaling would not be adequate to address significant additional network traffic associated with customers checking their accounts. Conventionally, the fallback would be reactive scaling, which will be quickly overwhelmed, causing massive failures. However, the perceptive scaling system 110 can identify the event from one or more news reports. Further, the timing of the event and event type information can be determined from context. Subsequently, computing resources likely impacted by the event can be identified, for example, by comparing the event type information with metadata or metatags associated with computing resources. The impact on a computing resource can next be determined or inferred based on context information and the impact of a similar event. In this instance, the number of people likely to be issued a stimulus payment might be known or able to be computed, for example, based on public or known data. A scaling strategy can then be generated and scheduled for activation based on the event's timing information. In this manner, the perceptive scaling system 110 allows effective scaling based on perceiving and responding to previously unknown events.

Figure 2:
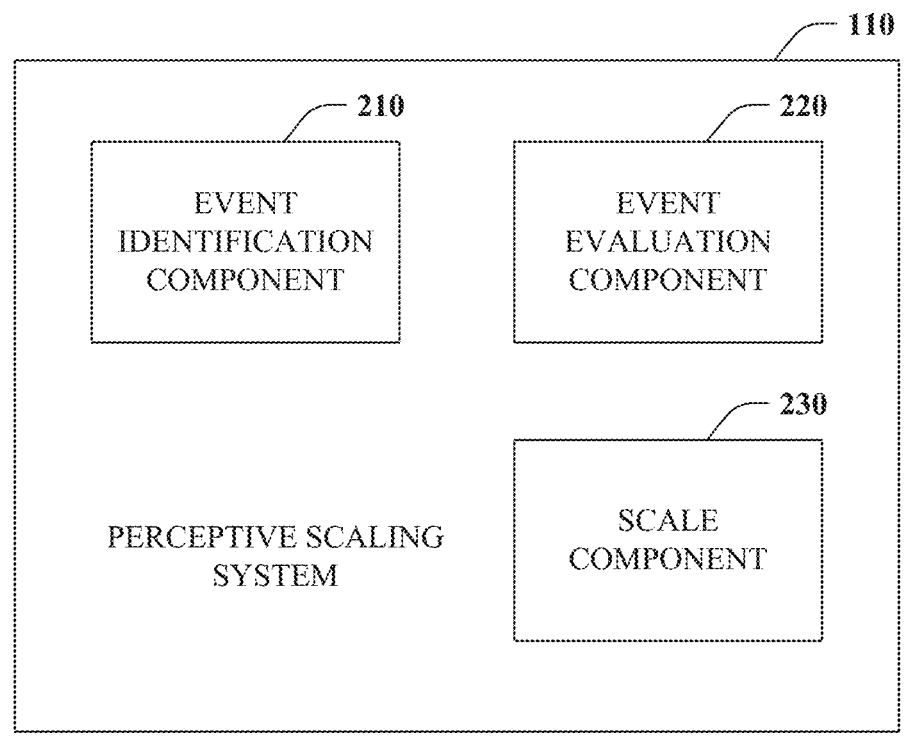
FIG. 2 is a block diagram of an example perceptive scaling system.

FIG. 2 is a block diagram of an example perceptive scaling system 110. The perceptive scaling system 110 includes event identification component 210, event evaluation component 220, and scale component 230. The event identification component 210, event evaluation component 220, and scale component 230 can be implemented by a processor coupled to a memory that stores instructions that cause the processor to perform the functionality of each component when executed. Consequently, a computing device can be configured to be a special-purpose device or appliance that implements the functionality of the perceptive scaling system 110. Further, all or portions of the perceptive scaling system 110 can be distributed across computing devices or made accessible by way of a network service. Furthermore, the perceptive scaling system 110 can be standalone or integrated within another resource scaling system.

The event identification component 210 is operable to identify an unknown future event. The event is unknown, meaning the event likely did not occur before, and it is impossible or difficult to predict the event's occurrence based on historical events. In other words, the event, occurrence date, or both are unknown. The event identification component 210 is configured to acquire news reports or the like from electronic sources, such as web pages, databases, or news feeds, among others. The news reports can be analyzed automatically for future events that can impact computing resource utilization. Unknown events can include government action such as issuing stimulus checks, declaring a national holiday, mandates, or regulations. The events can also be market-impacting factors, such as significant price changes of goods or services, introducing a new product, recalls, or reputational impact (e.g., *E. coli* outbreak at a restaurant).

A search can be performed for events that affect particular computing resources in one instance. The event identification component 210 can employ a plurality of technology to identify an event, including automatic text analysis and sentiment analysis, as well as optical character recognition to extract text from images, graphs, or graphics. In one embodiment, a machine learning model can be generated and subsequently invoked to identify future events. For example, a supervised learning approach can be utilized to train the model to identify events based on a set of training data that includes news reports and labels that identify one or more events. As part of the event identification, data regarding an event can also be acquired to enable subsequent analysis of the event. For example, machine-learning-based text analysis can be invoked to identify a future event as well as other information such as the date of occurrence from an electronic news source.

The event evaluation component 220 is operable to evaluate an event identified by the event identification component 210. The event evaluation component 220 can make determinations that can affect scaling decisions by the scale component 230. For example, the event evaluation component 220 can identify event duration, impact, and type, among other things. The same or similar machine-learning based text analysis can be employed to make or aid such determinations.

Figure 3:
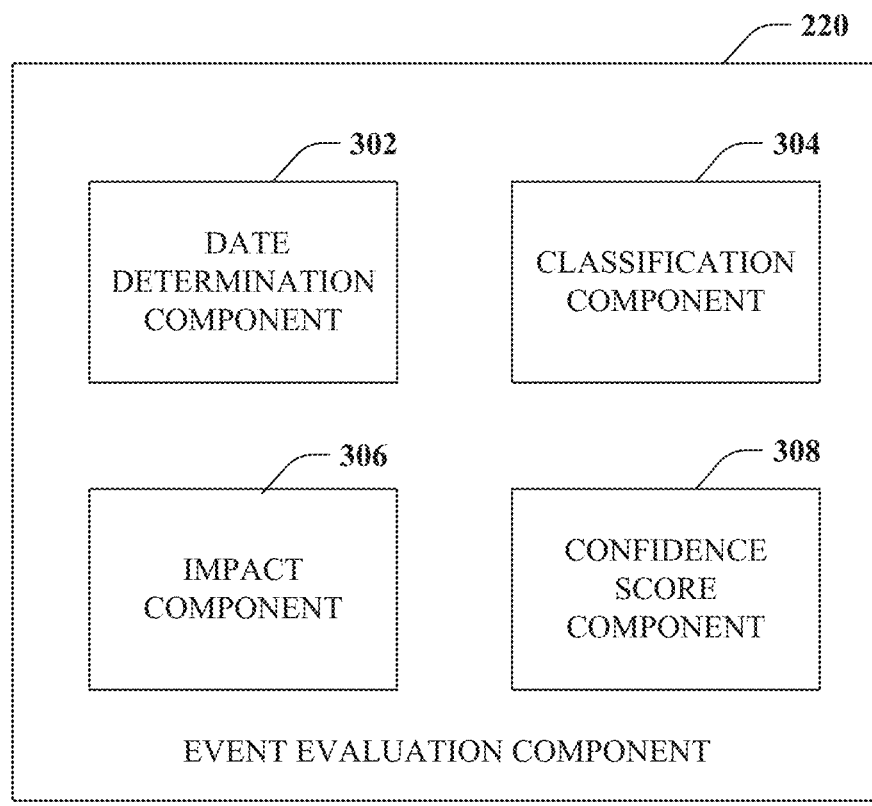
FIG. 3 is a block diagram of an example event evaluation component.

Turning attention to FIG. 3, an example event evaluation component 220 is illustrated in further detail. As shown, the event evaluation component 220 includes a plurality of subcomponents, namely date determination component 302, classification component 304, impact component 306, and confidence score component 308. Like components, subcomponents can be implemented by a processor coupled to a memory that stores instructions that cause the processor to perform the functionality of each component when executed.

The date determination component 302 is operable to determine or otherwise identify an event's date, time, and duration. If not captured during event identification, a search can be performed for such data over one or more news reports or other sources. For instance, the date determination component 302 can search the context surrounding an event. For example, suppose the event corresponds to the government's deposit of a stimulus check. In that case, news reports or the like can identify when deposits begin and possibly when they are expected to be completed. This information can be extracted and utilized to determine date information. Further, some data sources can include metadata in the form of metatags or the like that can include such information. Accordingly, the date determination component 302 can acquire date information from metadata, source content, or both.

The classification component 304 is operable to identify an event class or type. The type can be a single type or multiple-level type or class. The types can be predefined and specified in terms of one or more characteristics that comprise a type. For example, the type can correspond to an event cause such as government action, legal, or natural disaster. Classification can also involve identifying an affected industry, product, or service. For example, a government action of issuing a stimulus check can affect the financial services industry, such as banks and other financial institutions.

The impact component 306 is operable to determine or infer event impact. Stated differently, the impact component 306 seeks to quantify the extent of the event's effect. In one instance, the impact can correspond to a number of people affected by an event. In another instance, the impact can relate to the effect on one or more computing resources. Since the event may not have been encountered before, the impact can be difficult to predict based on historical data. However, context associated with a reported event can be employed to determine the impact in one embodiment. With respect to deposit of a stimulus check from the government, the report can indicate restrictions, eligibility, or an estimated number of citizens that will receive the stimulus check. From this information, the impact can be determined or inferred. The impact can also be determined or inferred from similar events. By way of example, if a new holiday is announced, such as national pizza day, information associated with a similar holiday, such as national donut day, can be utilized for reference in determining a likely impact.

The confidence score component 308 is operable to score or rate the confidence or likelihood that an event will occur. The confidence can be based on the density or number of news publications reporting the event. For instance, if solely one news article mentions the event, the confidence score would be low, indicating a lack of confidence that the event will occur. By contrast, if a lot of news articles report on an event, there is increased confidence that the event will happen.

Furthermore, the confidence score or a separate confidence score can capture the likelihood that an event will be impactful. For example, if an event is similar to a previous event (e.g., government issued a small check to half the population) the confidence score will be higher that there will be impact versus an entirely new event.

Still further yet, the confidence score or a different score can seek to capture the likelihood that an identified event is news or not. Consider a web crawler that identifies news from websites previously unknown to the system. The website may include news, fiction, a parody, or satire. Based on analysis of the text, context, and any available information about the website, a confidence score can be computed that indicates the probability that the event is news.

Returning to FIG. 2, the scale component 230 is operable to generate and schedule execution of a scaling strategy. The scale component 230 employs data provided by the event evaluation component 220 to generate a scaling strategy. The first consideration can be whether or not to generate a scaling strategy for an event. The consideration can be based on the type of event and resources affected as well as a confidence score associated with one or more factors of an identified event. For example, a scaling strategy may not be generated if the effect is on resources with which the scaling system is not applicable or if there is low confidence that the event is actual news, will occur, and is impactful. If a scaling strategy is generated, the scaling strategy can utilize a determined impact value, identified computing resources, and timing data to produce a strategy that enables computing resources to handle a computational load associated with the event and for the duration of an event load. For example, if an event is determined to affect a financial institution, a scaling strategy can be generated for particular computing resources likely to be affected, such as online or mobile banking servers. Further, the scaling strategy can be implemented or executed at a time prior to the occurrence of an event and after the event terminates.

In one instance, a web server can be scaled up or out to handle increased traffic on an online banking site as users check their accounts to determine whether a stimulus check has been electronically deposited or not. Moreover, the scaling strategy can account for dependent computing resources. For instance, one server can be an external-facing server to enable online banking while a database saves transactions. In this instance, the database may also need to be part of the scaling strategy to manage increased database reads. As another example, a pizza restaurant can have multiple servers for order processing, personnel, payroll processing, supply management, and human resources. An event, such as a national pizza day declaration, E. coli breakout at a competitor, or any other situation that increases orders, can affect the order processing more than other servers but can also affect other dependent or related servers.

The scaling strategy can be combined with other scaling strategies identified by a conventional proactive scaling system. For example, a computing resource that is the subject of perceptive scaling can also be subject to proactive scaling based on historical patterns. For instance, scaling may be designated for a resource to accommodate additional load on weekdays from 9 a.m. to 5 p.m. A perceptive scaling strategy can be combined with the proactive scaling strategy resulting in a combined scaling strategy. In other words, a perceptive scale factor (e.g., three additional resources) can be added to a conventional proactive scale factor (e.g., one additional resource) to produce a resultant scale factor (e.g., four additional resources) to apply for a computing resource.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the perceptive scaling system 110, including the event identification component 210 and event evaluation component 220, can employ such mechanisms to automatically identify and evaluate future events with respect to resource scaling. For instance, supervised machine learning can be employed. A machine learning model (e.g., neural network) is trained with labeled training data to identify future events and characteristics of future events from electronic news reports utilizing natural language processing.

In view of the example systems described above, methods that may be implemented in accordance with the disclosed subject matter will be better appreciated with reference to flow chart diagrams of FIGS. 4-7. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
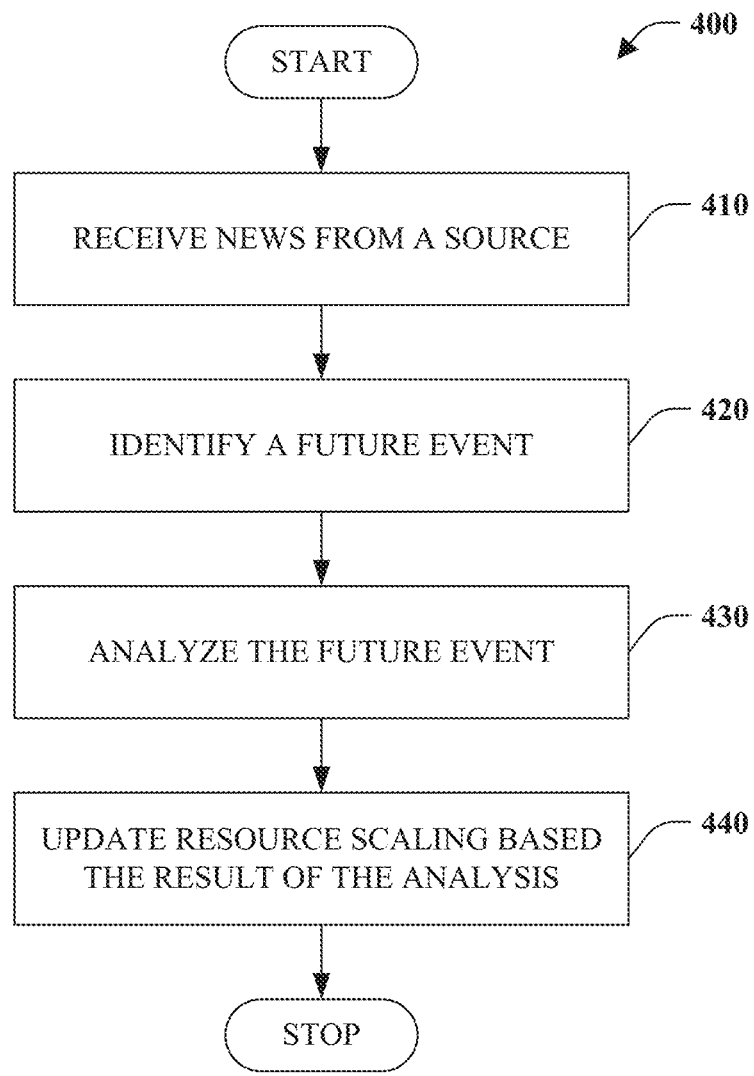
FIG. 4 is a flow chart diagram of a method of perceptive scaling of computing resources.

Turning attention to FIG. 4, a method 400 of perceptive scaling is illustrated. The method 400 can be implemented and executed by the perceptive scaling system 110 of FIGS. 1 and 2.

At reference numeral 410, news from a source is received, retrieved, or otherwise obtained or acquired. News can comprise information about current and future events. News topics can correspond to government, politics, weather, or unusual events. News, or news reports, can be acquired from one or more electronic sources, such as websites, databases, or subscription-based feeds, among others.

At numeral 420, an event is identified in the news. The event can correspond to a previously unknown or unpredictable future event, such as issuance of a stimulus check to citizens by their government, declaration of a national holiday, government mandates, or catastrophic weather such as an earthquake, hurricane, volcano eruption, or wildfire. The event can be identified by analyzing the text of a news report. Machine learning can be employed to understand language and identify events in one instance. For example, a neural network can extract an event from one or more news reports utilizing natural language processing.

At reference numeral 430, an identified future event is analyzed. The analysis can correspond to identifying various features or characteristics of the event. For example, the event's date, time, and duration can be determined based on context information surrounding an event. Additionally, an event type can be determined and assigned to the event. Further, context or other information can be employed to determine a potential impact associated with the event's occurrence.

At reference numeral 440, a scaling strategy can be generated based on the result of the event analysis. For example, computing resources likely to be impacted by the identified event can be determined based on the event type. Additional dependent computing resources can also be identified based on metadata or call tracing. Further, a scaling type and extent can be determined based on the likely impact of the event determined as part of event evaluation. Further, time, date, or duration information can be employed to identify when scaling should be performed. Affected computing resources, scale factors, and timing information can comprise the scaling strategy that can subsequently be employed before the event's occurrence.

Figure 5:
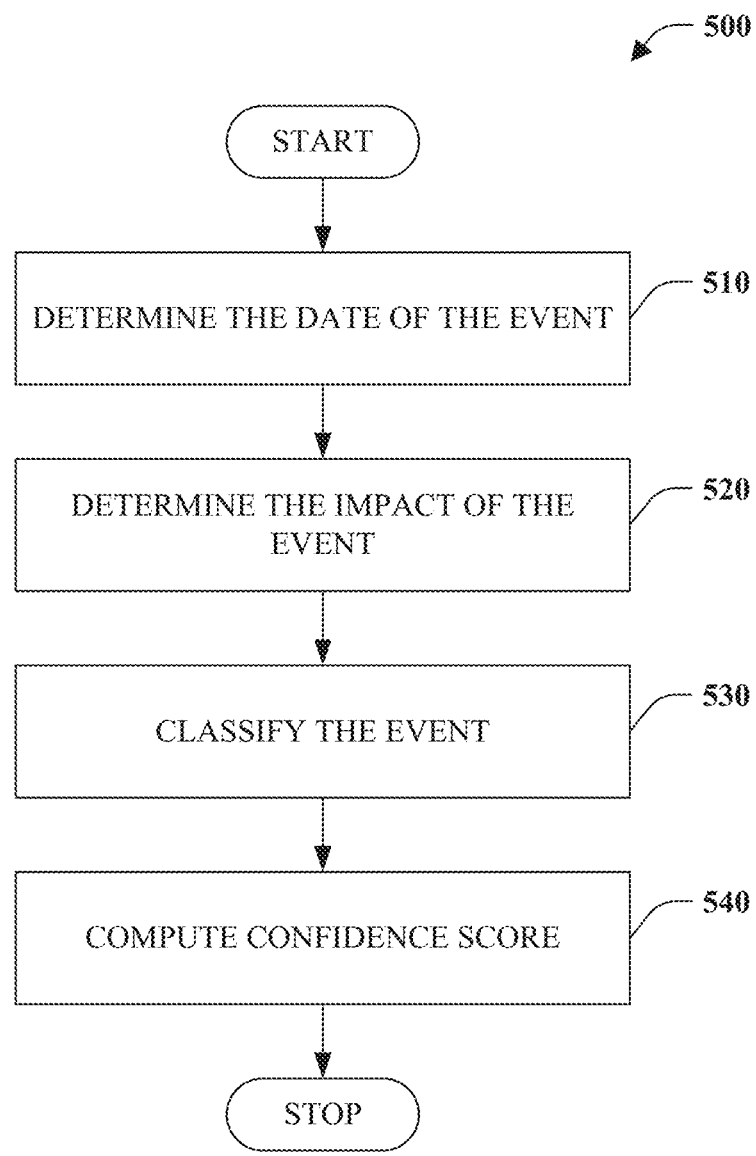
FIG. 5 is a flow chart diagram of a method of evaluating an event.

FIG. 5 depicts a method of event analysis 500. The method can be implemented and executed by the perceptive scaling system 110 and, more particularly, the event evaluation component 220.

At reference numeral 510, the date of the event is determined or inferred. The date corresponds to a particular date in the future at which the event occurs. In one instance, the date can also include a time on the date that the event is to occur. Further, the date can capture the duration between start and end dates. News reports can be searched that mention the event and surrounding content, or context, can be analyzed to identify or otherwise infer the date. For example, a news report can note a particular date in the future to be deemed national pizza day. This date can be extracted from the report.

At numeral 520, the event's impact can be determined or inferred. The impact quantifies the extent of the effect of the event. In one instance, the impact can correspond to a number of people affected by the event. Alternatively, the impact can relate to the effect on one or more computing resources. Since the event may not have been encountered before, the impact can be difficult to predict based on historical data. Consequently, the impact can be inferred based on similar events. Further, the impact can also be determined based on the content of a news report regarding an event. The content can be analyzed and utilized to extract information related to impact. For example, the report can specify how many people are affected by the event. Furthermore, the number of news sources that report on the event can be indicative of the impact and utilized as a basis for determining the impact.

At reference numeral 530, the event is classified or typed. The type can be a single type or multiple-level type or class. The types can be predefined and specified in terms of one or more characteristics that comprise a type. For example, the type can correspond to an event cause, such as government action, legal, or natural disaster. Classification can also involve identifying an affected industry, product, or service. For example, a government action of issuing a stimulus check can affect the financial services industry, such as banks and other financial institutions. Consequently, the event can be classified or typed as affecting financial institutions.

At numeral 540, a confidence score is computed. The confidence score quantifies the likelihood or probability one or more factors related to an event. In one instance, a confidence score can be computed that quantifies the likelihood that an event is news as opposed to something else such as fiction or satire. In another instance, the confidence score or a separate score can be computed that captures the likelihood that an event will occur, for example based on the news report density or number of news sources reporting the event. In yet another instance, the confidence score or a separate score can quantify the probability that the event will be impactful, for example based on comparison of the similarity to other events that have occurred in the past. Multiple confidence scores can be computed and employed representing various factors. Alternatively, a single composite confidence score can be computed that represents all factors potentially with different weights. A confidence score that satisfies a predetermined threshold may be deemed suspect. In such a situation, further processing can be performed. For example, the event can be forwarded to a human user to verify.

Figure 6:
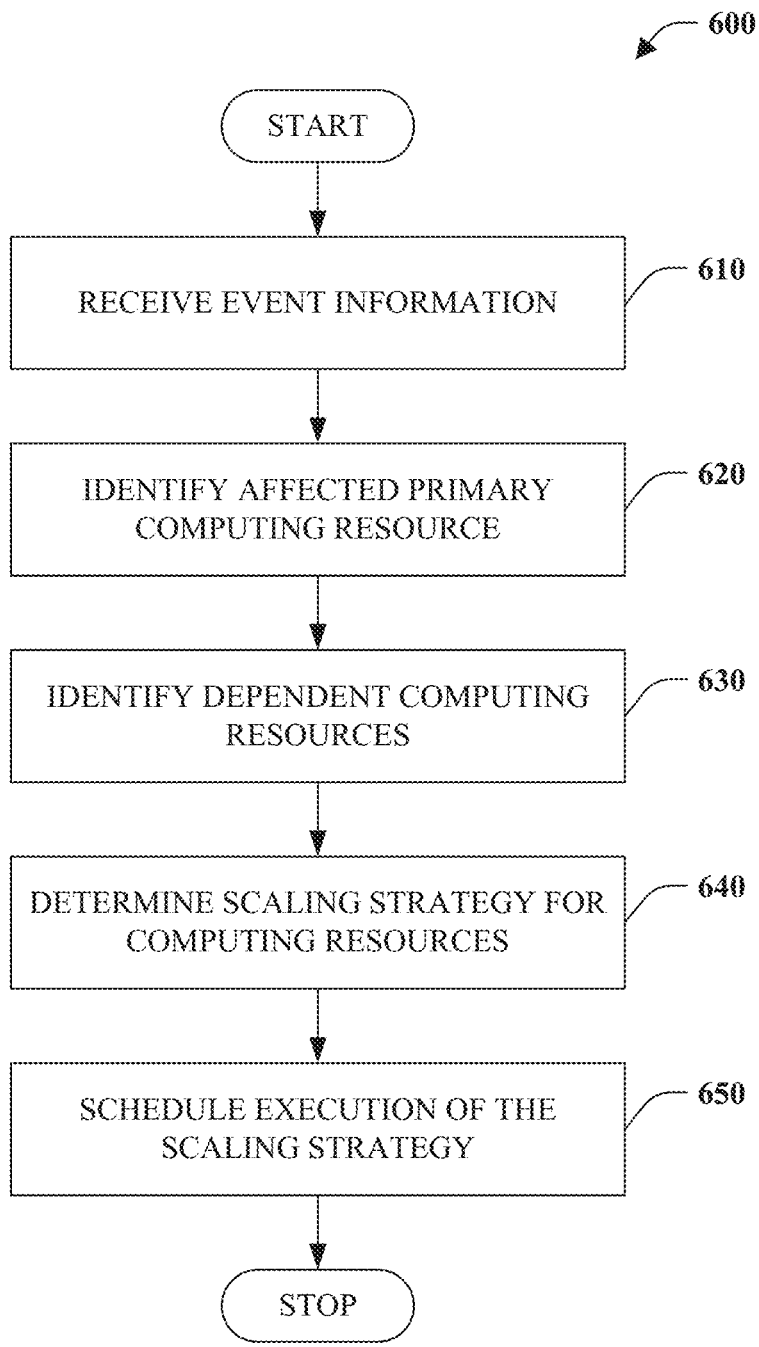
FIG. 6 is a flow chart diagram of a method of perceptive scaling with dependent resources.

FIG. 6 depicts a flow chart diagram of a method 600 of perceptive scaling. The method 600 can be performed by the perceptive scaling system 110. In one instance, the method 600 can be performed by the scale component 230.

At reference numeral 610, event information is received, retrieved, or otherwise obtained or acquired. The event information can correspond to a class or type of event. For example, the event information can indicate the event is associated with a particular industry or business. Further, event information can drill into particular parts of a business or system. In one instance, a geographic location affected by the event can be provided by the event information.

At reference 620, a primary computing resource affected by an event can be identified. The event information can be utilized to aid in identifying the primary computing resource. In one instance, resources can include metadata, such as metatags, which capture information about computing resources. For example, the computing resource can include automatically or manually generated tags that capture event types that affect the computing resource. Accordingly, resource identification can involve matching types associated with events and computing resources. Suppose the event information indicates an event is a financial event associated with online banking. In this instance, a web server supporting online banking can be identified as the primary computing resource. By way of example, and not limitation, an event that causes financial institution customers to check their balance can affect servers related to logging in and querying ledger information but not payment processing or shareholder servers.

At reference numeral 630, dependent computing resources are identified. Dependent computing resources are those upstream or downstream from the primary computing resource. An upstream computing resource is one from which the primary computing resource depends. A downstream computing resource depends on the primary computing resource. Dependent computing resources can be identified based on metadata associated with computing resources that provide this information. Otherwise, a design document can be referenced, or call tracing employed to identify dependencies. By way of example, a backend database that provides data for display by a web server can correspond to a downstream dependent computing resource. Further, a login server tasked with user authentication and authorization can be an upstream computing resource to a web server responsible for online banking content.

At numeral 640, a scaling strategy is determined for computing resources. The scaling strategy can be based on an expected or predicted impact of an event on the primary and dependent computing resources. The impact corresponds to additional traffic or processing associated with an event, which can be extracted from news report content or inferred based on similarity of events, for example. The scaling strategy can specify scaling out (e.g., additional resources), scaling up (e.g., increasing the capacity of a resource), or both for computing resources. The scaling strategy can also specify termination of the strategy or scaling down a predetermined time after an event ends. For events longer than a day, the scaling can specify scaling out and in each day or other time period. The scaling can be the same or different for a primary computing resource and a dependent computing resource based on event impact.

At reference numeral 650, the scaling strategy is scheduled for execution. The scaling strategy can be scheduled a predetermined time before the event occurs, for example, to add or increase the capacity of resources to support an additional load associated with the event. Alternatively, the scaling strategy can specify a decrease in resources or capacity when an event reduces resource load. Further, execution of the strategy can specify scaling in and out or up and down at different times. In accordance with one aspect, the scaling strategy can be merged with other scaling strategies associated with conventional reactive and proactive scaling.

Figure 7:
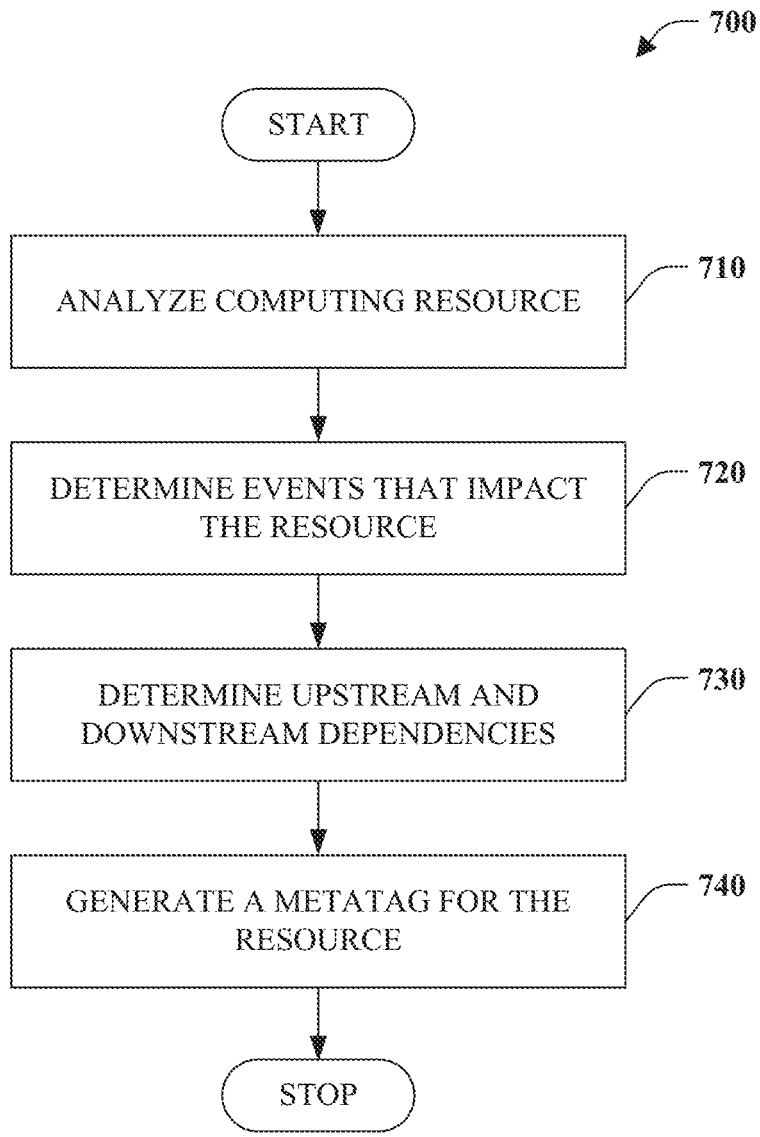
FIG. 7 is a flow chart diagram of a method of capturing resource dependencies.

FIG. 7 is a flow chart diagram of a method 700 of capturing resource dependencies. The method 700 can be executed by the perceptive scaling system 110 or another component or system outside the perceptive scaling system 110.

At reference numeral 710, a computing resource is analyzed. The analysis can result in a determination of the function of the computing resource. In one instance, the function can correspond to determining a resource type. For example, the computing resource could be a server of a particular type (e.g., file, mail, web, security . . . ), a database, or a network device. Further, analysis can involve determining a type or class of data. Additional characteristics can also be inferred from other determined features. For example, an industry or business can be inferred based on resource and data types.

At reference 720, events likely to impact a resource are determined. Based on at least information determined by analysis of a computing resource, types of events that are likely to involve the resource can be determined or otherwise inferred. For example, an online banking server can be impacted by an event that causes customers to access their bank account more frequently than they otherwise would access their account. Any event that causes individuals to access their bank account can be identified, such as a government stimulus check. As another example, a pizza shop online order system can be affected by any event that is likely to cause people to order pizza, such as the declaration of a national pizza day.

At numeral 730, upstream and downstream dependencies of the computing resource are determined. A resource on which the computing resource depends, for example, for input, can be an upstream dependency. A resource that depends on the computing resource, for example, from the computing resource's output, can be deemed a downstream dependency. These dependencies can be determined by analyzing a text document, structured content document, or diagrams, among other things, that describes dependencies or interactions. Additionally, or alternatively, the dependencies can be determined based on call tracing that identifies which resources communicate with other resources.

At reference numeral 740, a metatag is generated for the resource. The metatag captures metadata, or data about data, associated with a resource that includes the tag or identifier. The metadata or metatag can include data about the computing resource, including characteristics of the resource, types of events that impact the resource, and upstream and downstream dependent resources. Stated differently, the metatag comprises results of computing result analysis, which can be employed to generate a scaling strategy to address the occurrence of an event.

This disclosure pertains to the technical problem of automatic computing resource scaling. The technical solution comprises perceptive computing resource scaling. Future events can be identified from news sources. After an event is identified, the event can be analyzed to determine the date and impact of the event. Further, the event can be scrutinized to determine a type of event and confidence score regarding the event. Computing resources affected by an event are identified based at least in part on metatags associated with the resources. Dependent computing resources can also be identified. A scaling strategy can be formulated based on the result of the event analysis. The scaling strategy can then be scheduled to scale computing resources as needed for an event prior to the event.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
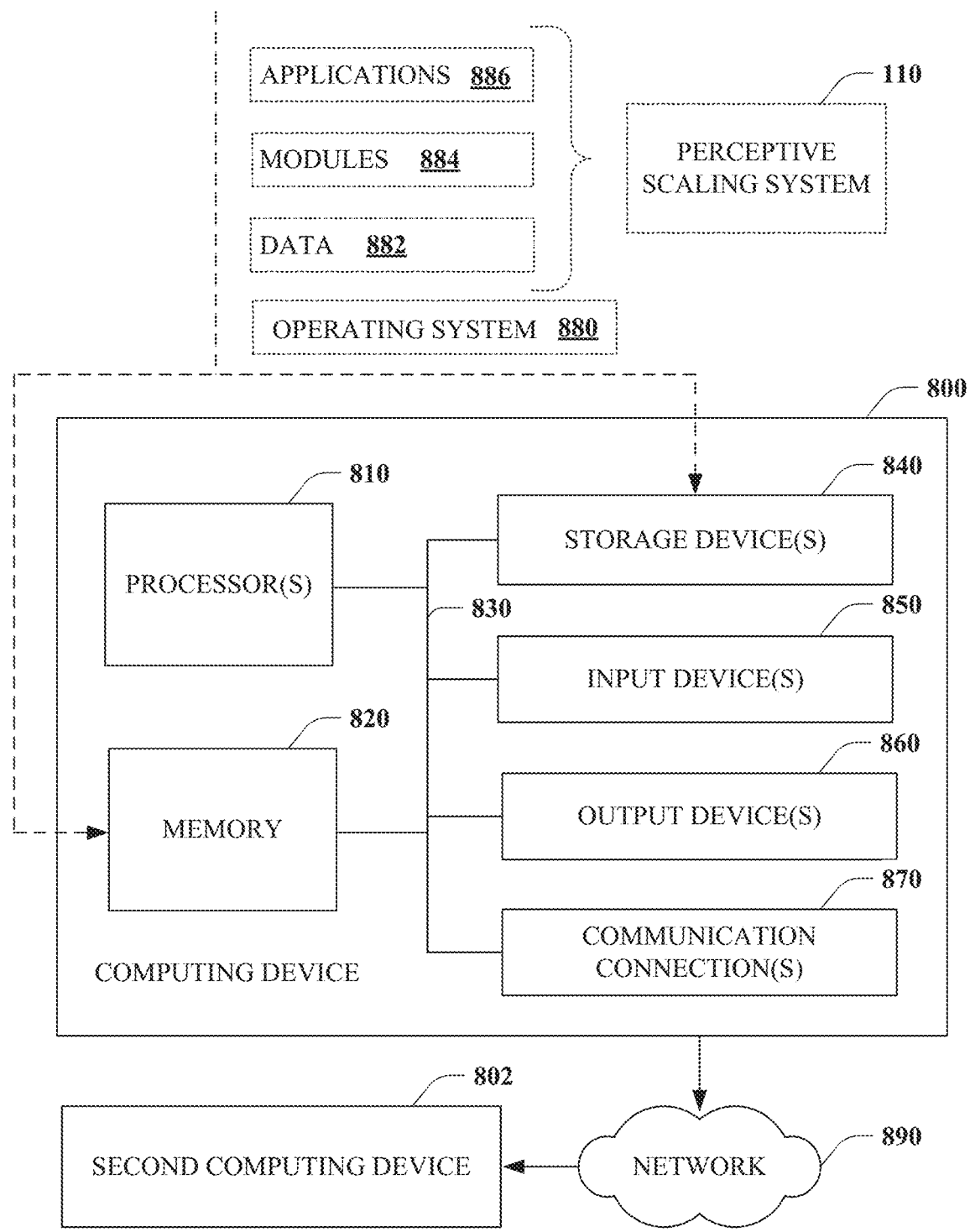
FIG. 8 is a block diagram illustrating a suitable operating environment for aspects of the subject disclosure.

To provide a context for the disclosed subject matter, FIG. 8, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, which perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on standalone computers. In a distributed computing environment, program modules may be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node, . . . ). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming and/or engineering techniques to produce software, firmware, hardware, or any combination thereof to control the computing device 800 to realize the disclosed functionality. By way of example and not limitation, all or portions of the perceptive scaling system 110 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the perceptive scaling system 110 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth, . . . ), or a combination thereof.

The computing device 800 can also include communication connection(s) 870 to enable communication with at least a second computing device 802 utilizing a network 890. The communication connection(s) 870 can include wired or wireless communication mechanisms to support network communication. The network 890 can correspond to a personal area network (PAN), local area network (LAN), or a wide area network (WAN) such as the Internet. In one instance, the computing device 800 can correspond to a server executing the scaling perceptive scaling system 110. The second computing device 802 can correspond to a computing resource or scale controller for the resource. In this instance, the computing device 800 can communicate with the second computing device 802 to trigger scaling per a scaling strategy generated by the computing device 800. In another instance, the second computing device 802 can execute conventional scaling technology, which can be augmented based on the generation of a scaling strategy by the computing device 800.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
    one or more processors and memory comprising instructions that, when executed by the one or more processors, cause operations comprising:
       in connection with invoking a machine-learning-based text analysis of electronic news data to identify a computing resource metatag related to a future event and date of the future event, identifying (i) a computing resource affected by the future event and associated with the computing resource metatag and (ii) downstream resources that depend on the computing resource;
       generating a scaling strategy for the computing resource and the downstream resources that accounts for a change in resource utilization associated with the future event; and
       triggering execution of the scaling strategy at a predetermined time before the date.

2. A method comprising:
    executing, by one or more processors, operations comprising:
       invoking machine-learning-based text analysis to identify a computing resource metatag related to a future event and a date of occurrence for the future event based on electronic news data from an electronic news source;
       identifying, based on the machine-learning-based text analysis, (i) a computing resource associated with the computing resource metatag and (ii) downstream resources that depend on the computing resource;
       generating a scaling strategy for the computing resource and the downstream resources that accounts for a change in resource utilization associated with the future event; and
       triggering execution of the scaling strategy a predetermined time before the date.

3. The method of claim 2, wherein the computing resource metatag specifies an event type, the operations further comprising:
    evaluating metatags associated with a plurality of computing resources; and
    identifying the computing resource from the plurality of computing resources based on the computing resource being associated with the computing resource metatag specifying the event type.

4. The method of claim 2, the operations further comprising:
    inferring an impact of the event on the computing resource; and
    generating the scaling strategy proportionate to the impact.

5. The method of claim 4, the operations further comprising determining the impact based on a number of reports of the event.

6. The method of claim 4, the operations further comprising inferring the impact based on comparison to a similar prior event.

7. The method of claim 4, the operations further comprising inferring the impact based on information specified in the electronic news source.

8. The method of claim 2, wherein the computing resource metatag specifies a dependent computing resource of the computing resource, and wherein generating the scaling strategy comprises scaling of the dependent computing resource based on the computing resource metatag specifying the dependent computing resource.

9. The method of claim 2, the operations further comprising:
    determining a duration of the event; and
    scheduling termination of the scaling strategy at a predetermined time after the duration of the event.

10. The method of claim 2, wherein the computing resource metatag specifies a downstream computing resource that depends on the computing resource, and wherein generating the scaling strategy comprises scaling of the downstream computing resource based on the computing resource metatag specifying the downstream computing resource.

11. The method of claim 2, wherein the computing resource metatag specifies an upstream computing resource of the computing resource, and wherein generating the scaling strategy comprises scaling of the upstream computing resource based on the computing resource metatag specifying the upstream computing resource.

12. The method of claim 2, wherein invoking the machine-learning-based text analysis comprises invoking the machine-learning-based text analysis on news text data from a plurality of new sources to determine whether respective text data from a given news source includes valid news, the operations further comprising:
    determining that the respective text data of the electronic news source of the plurality of new sources includes valid news, and using the computing resource metatag to generate the scaling strategy based on the determination that the respective text data of the electronic news source includes valid news;
    determining that the respective text data of a second electronic news source of the plurality of new sources does not include valid news; and
    determining not to generate a second scaling strategy related to a second computing resource metatag, derived from the respective text data of the second electronic news source, based on the determination that the respective text data of the second electronic news source does not include valid news.

13. One or more non-transitory computer-readable media storing instructions that, when executed by one or more processors, cause operations comprising:
   obtaining electronic news data from an electronic news source;
   determining, based on a machine learning model processing the electronic news data, a computing resource metatag related to an event;
   identifying (i) a computing resource associated with the computing resource metatag and (ii) downstream resources that depend on the computing resource; and
   automatically executing a scaling strategy for the computing resource and the downstream resources in connection with the event.

14. The one or more non-transitory computer-readable media of claim 13, wherein the computing resource metatag specifies an event type, the operations further comprising:
   evaluating metatags associated with a plurality of computing resources; and
   identifying the computing resource from the plurality of computing resources based on the computing resource being associated with the computing resource metatag specifying the event type.

15. The one or more non-transitory computer-readable media of claim 13, the operations further comprising:
   inferring an impact of the event on the computing resource; and
   generating the scaling strategy proportionate to the impact.

16. The one or more non-transitory computer-readable media of claim 13, wherein the computing resource metatag specifies a dependent computing resource of the computing resource, and wherein generating the scaling strategy comprises scaling of the dependent computing resource based on the computing resource metatag specifying the dependent computing resource.

17. The one or more non-transitory computer-readable media of claim 13, the operations further comprising:
   determining a duration of the event; and
   scheduling termination of the scaling strategy at a predetermined time after the duration of the event.

18. The one or more non-transitory computer-readable media of claim 13, wherein the computing resource metatag specifies a downstream computing resource that depends on the computing resource, and wherein generating the scaling strategy comprises scaling of the downstream computing resource based on the computing resource metatag specifying the downstream computing resource.

19. The one or more non-transitory computer-readable media of claim 13, wherein the computing resource metatag specifies an upstream computing resource of the computing resource, and wherein generating the scaling strategy comprises scaling of the upstream computing resource based on the computing resource metatag specifying the upstream computing resource.

20. The one or more non-transitory computer-readable media of claim 13, the operations further comprising:
   invoking a machine learning model to process news text data from a plurality of new sources to determine whether respective text data from a given news source includes valid news, the plurality of new sources comprising the electronic news source and a second electronic news source;
   using the computing resource metatag to generate the scaling strategy based on a determination that the respective text data of the electronic news source includes valid news; and
   determining not to generate a second scaling strategy related to a second computing resource metatag, derived from the respective text data of the second electronic news source, based on a determination that the respective text data of the second electronic news source does not include valid news.

* * * * *